United States Patent [19]

Sirinyan et al.

[11] Patent Number: 4,535,032
[45] Date of Patent: Aug. 13, 1985

[54] BLACK-METALLIZED SUBSTRATE SURFACES

[75] Inventors: Kirkor Sirinyan; Rudolf Merten, both of Leverkusen; Henning Giesecke, Cologne, all of Fed. Rep. of Germany

[73] Assignee: Bayer Aktiengesellschaft, Leverkusen, Fed. Rep. of Germany

[21] Appl. No.: 539,034

[22] Filed: Oct. 5, 1983

[30] Foreign Application Priority Data

Oct. 22, 1982 [DE] Fed. Rep. of Germany ....... 3239090

[51] Int. Cl.³ ............................ C23C 3/02; C23F 5/02; F24J 3/02
[52] U.S. Cl. ..................................... 428/629; 428/143
[58] Field of Search ................................. 428/629, 143

[56] References Cited

U.S. PATENT DOCUMENTS 3,903,319 9/1975 El-Mohamad ........................ 427/12

FOREIGN PATENT DOCUMENTS 0018219 10/1980 European Pat. Off. .
3047703 7/1982 Fed. Rep. of Germany .

OTHER PUBLICATIONS

E. M. Lushiku et al., Solar Energy, vol. 19, pp. 272–276, 1976.

*Primary Examiner*—Veronica O'Keefe
*Attorney, Agent, or Firm*—Sprung, Horn, Kramer & Woods

[57] ABSTRACT

Black-metallized substrate surfaces which are characterized by the fact that they reflect at most 20% of electromagnetic radiation within the wavelength range from 200 to 5,000 nm and at least 50% within the wavelength range from 7,000 to 24,000 nm, the percentages being relative to the mean value over the entire wavelength range in each case, and which can be used as sunlight collectors are obtained by metallizing activated substrate surfaces without current in metallizing baths which contain a polymeric surface-active compound.

8 Claims, No Drawings

BLACK-METALLIZED SUBSTRATE SURFACES

The invention relates to preferably sheet-like black-metallised substrates and to their preparation and use as collectors for sunlight.

In addition to substrates which have been coated with metal oxides, it is also possible to use aluminium or steel foils or plastic films which have been pigmented with carbon black or other black dyestuffs as collectors for sunlight. Plastic films pigmented with carbon black or other black dyestuffs have the disadvantage that they absorb incident light rays over the entire wavelength range and thus have a low efficiency of conversion of light energy into heat. Aluminium and steel foils, on the other hand, reflect too much of the incident light, and because of that they are likewise of low efficiency.

So-called "black" metal or metal oxide layers are much more efficient in converting light into heat. "Black" means that these layers essentially have no metallic gloss. This property is the result of a certain way of absorbing electromagnetic radiation. Thus, A. Aveline and I.R. Bonilla report in Solar Energy Materials 5 (1981), 211 to 220, on copper oxide ($Cu_2O$) surfaces which are produced in a complicated manner by partially oxidising copper surfaces. G. B. Smith and A. Ignatiev, Solar Energy Materials 4 (1981), 119 to 133, describe black chromium-molybdenum surfaces which are suitable for use as solar absorbers. These chromium-molybdenum surfaces are made by electroplating chromium-molybdenum onto a substrate which has to be electrically conductive. The coatings thus obtained have the disadvantage that their thickness depends on the geometry of the support. For this reason the complete coating of relatively large areas requires the deposition of coats with a thickness of several micrometers.

The object of the invention is then to make available substrates, preferably sheet-like structures, which have been provided with a "black" metal layer in a simple and inexpensive manner.

This object is achieved by subjecting the substrates which are to be metallised and which have been conventionally activated with metals of auxiliary group 1 or 8 to a currentless, wet-chemical metallisation in metallising baths which are known per se and which additionally contain a polymeric organic surface-active compound having a molecular weight of at least 400.

The resulting metallised substrates have a 0.01 to 2 $\mu$m thick metal coat and are characterised in that they reflect at most 20% of electromagnetic radiation within the wavelength range from 200 to 5,000 nm and at least 50% within the wavelength range from 7,000 to 24,000 nm, the percentages relating to the mean value over the entire respective wavelength range.

Polymeric organic compounds are to be understood as meaning anionic, kationic or neutral dispersions, emulsions and latices or mixtures thereof which are homogeneously distributed in the metallising baths in amounts of 0.1–10 g/liter. Additives of this type which are completely or partially swellable in aqueous media are particularly highly suitable for carrying out the process of the invention. To obtain better interaction between the substrate surface to be metallised black and the metal ions to be reduced, or the reducing agents, in the chemical metallising bath, or to increase the adhesion of the black metal layer to the substrate surface, it is particularly preferable to use polymeric additives which are of the above type and which have functional groups.

Examples of these functional groups are carbonyl groups, such as aldehyde, ketone, carboxyl, carboxylate, dichlorocarbonyl, carboxamide or carboximide groups, and/or $SO_2$ groups, such as sulphonyl, sulpho, sulphonate, chlorosulphonyl or sulphonamide groups, and/or amino groups and/or alcohol groups and/or ether groups and/or mercaptan groups.

To prevent the latices, dispersions and suspensions suitable for carrying out the process according to the invention from coagulating, they and/or the metallising baths used can be admixed with stabilisers and emulsifiers. Highly suitable for this purpose are anionic emulsifiers, such as, for example, alkali metal salts of palmitic acid, stearic acid, or oleic acid, sodium salts of sulphonic acids which are prepared by sulphochlorinating paraffins containing 6–20 carbon atoms, nonionic emulsifiers which can be prepared, for example, by ethoxylating long-chain alcohols or phenols, cationic emulsifiers, such as, for example, salts of long-chain, in particular unsaturated, amines having 12 to 20 C atoms or quaternary ammonium compounds with long-chain olefines or paraffin esters, protective colloids based on macromolecular compounds, such as, for example, gelatin, pectins, aginates, methylcellulose, polyvinyl alcohols, polyvinyl pyrrolidone, polymethyl vinyl acetate, or finely distributed water-soluble minerals, such as alumina, kieselguhr, or calcium phosphates.

The amount of the stabilisers or emulsifiers listed above can be varied, relative to dry polymeric additives, between 0.01 and 15% by weight, the range from 0.1 to 2.0% by weight being particularly preferred.

Polymeric compounds preferably used are latices and/or emulsions based on styrene-butadiene and/or acrylonitrile graft polymers and copolymers, polyisoprene, homopolymers and/or copolymers, polyacrylates, polyvinyl chloride, polyvinyl acetate, anionic, neutral and cationic polyurethane dispersions or mixtures thereof.

A further particularly preferred embodiment of the process according to the invention for black-metallising substrate surfaces is characterised in that the surfaces of polymer articles are coated, by dipping, printing or spraying, with the abovementioned organic polymers, dispersions, latices or emulsions, which are swellable in aqueous solutions, and, after some or all of the solvent has been removed, are metallised in customary chemical metallising baths with a black metal layer.

Those of the abovementioned polymers which have additional functional groups are particularly highly suitable for carrying out this version of the process according to the invention.

In addition to the latices, dispersions and emulsions already mentioned, it is also possible to use waterswellable macromolecular compounds which are applied in the form of a homogeneous film to the substrate surface which is to be metallised black, gelatin, pectines, polymethylcellulose, polyvinyl alcohols, polymethyl vinyl acetate or polyvinylpyrrolidone being used particularly prefferably. The thickness of these coatings, which are accessible to the metal ions to be reduced, should be 0.01–20 $\mu$m.

Suitable substrates for the process according to the invention are steels, glass, aluminium, copper, silver, gold, platinum, ceramic material, paper, polyethylene, polypropylene, polyvinyl halides, epoxy resins, polyesters, polyamides, polyhydantoin, ABS graft polymers or copolymers, asbestos, and textile sheet-like structures, threads and fibres. In particular, black-metallised temperature-resistant substrates made of, for example, Cu, Al or Fe are highly suitable for manufacturing concentrating solar collectors. In this type of collector, in contrast to sheet-like collectors, the incident solar rays are concentrated on an absorber arranged at the focal point of the mirror system, and the resulting temperatures can be very high, and it is for this reason that heat-stable substrates based on, for example, metal are suitable for manufacturing this type of absorber.

How the substrate surfaces to be chemically metallised have been activated has no great influence on how the process according to the invention is carried out. Thus, not only ionic and/or colloidal elements of auxiliary groups 1 and 8 of the periodic system, such as palladium and silver, but also their organometallic derivatives are suitable.

It is also possible to use mixtures of the specified activators. If the activators have been dissolved in solvents, the concentration should generally be between 0.01 and 10 g per liter. Suitable solvents are not only water but also organic polar, protic and aprotic solvents, such as methylene chloride, chloroform, acetone, 1,1,1-trichloroethane, alcohols and perchloroethylene.

The reducing agents customary in electroplating technology, such as hydrazine hydrate, formaldehyde, hypophosphite or boranes, are used to reduce the metal ions in the metallising baths. It is preferable to do the black-metallising in an aqueous solution.

Black-metallising baths which can be used in the process according to the invention are, in particular, baths containing nickel salts, cobalt salts, iron salts, copper salts or gold and silver salts or mixtures thereof. Ni, Co and Cu baths are preferred.

Although it is known to metallise in a currentless, wet-chemical fashion substrate surfaces after they have been activated with metals of auxiliary group 1 and 8 of the periodic system of the elements (for example as in German Offenlegungsschrift 2,743,768 and German Offenlegungsschrift 3,025,307), the activating and metallising baths used in this prior art contain neither surface-active compounds having a molecular weight of at least 400 nor swelling agents for the substrate surfaces, so that the metal surfaces obtained are not "black"—"-black" as defined by the above reflectance characteristics—but metallically glossy and have largely good reflectance properties over the entire wavelength range.

The following examples illustrate the new invention in more detail without limiting its scope.

EXAMPLE 1

A nylon film (200×200×0.5 mm) was activated at RT (room temperature) in the course of 2 minutes in an activating bath prepared from 0.7 g of 4-cyclohexene-1,2-dicarboxylic anhydride/palladium(II) chloride and 1 liter of $CH_2Cl_2$. After the solvent has been evaporated off, the film is metallised at RT in 2.5 liters of a chemical nickelplating bath* which is of the type customary in electroplating technology and which, made up from $NiSO_4$, dimethylaminoborane, citric acid and water, is brought to about pH 8.2 with aqueous ammonia solution and is then admixed with 125 ml of an aqueous anionic 50% by weight strength dispersion. This dispersion consists of 38% by weight of polyester based on adipic acid and hexanediol and has a mean molar mass of 1,700, 8% by weight of isophoronediamine and 4% by weight of isophorone diisocyanate. The surface of the film turns black in as short a time as 0.5 minute. The black nickel layer reaches a thickness of about 0.2 μm in the course of metallising for about 15 minutes and has a rough, stippled surface and an electric resistance of about 0.8 Ω. This black Ni layer has almost ideal absorption and reflectance properties in respect of incident light rays and is thus highly suitable for manufacturing solar collectors. Since this layer is impermeable to infrared radiation, it is, furthermore, suitable for agricultural purposes.

*(S. R. Weiner, "Chemische Vernickelung (Chemical Nickelplating)", Eugen G. Lenze Verlag (1974))

The ESCA (electron spectroscopy for chemical analysis) data show that this metal layer, in addition to metallic nickel, also consists of its boron derivatives or oxides. Its microwave transmission and reflectance behaviour at 2.6–3.9 and 9 to 10 GHz (radar bands) can be taken from the following table.

| Transparency T and reflectance loss R measurements in db | | | | |
|---|---|---|---|---|
| | Frequency ranges | | | |
| | 2.6–3.9 GHz | | 9–10 GHz | |
| Sample | T | R | T | R |
| black nickel | 21 | 0.75 | — | —* |
| black nickel 45 × 45 cm | 20–22 | 0.3–1 | 20–23 | — |
| black nickel 45 × 45 cm | 22–23 | 0.6 | 17–19 | — |

*Dimension too small

EXAMPLE 2

A polyester film sized 200×200×0.5 mm was activated in the activating bath described in Example 1. When the solvent has dried, the film is metallised in a chemical Co-Ni bath which, in addition to the components given in Example 1, also contains 8% by weight of cobalt and is adjusted to about pH 7.2.

The film is observed to turn black in as short a time as 30 seconds. In the course of 15 minutes it can be metallised with an approximately 0.22 μm thick black metal layer. The ESCA data show that this film consists not only of metallic nickel but also of cobalt and borides and oxides thereof.

This metal layer has a rough, stippled surface and is not transparent to light rays. Its absorption or reflectance properties are virtually identical to those of the film described in Example 1.

EXAMPLE 3

A 100×100 mm square piece of polished copper foil is activated as in Example 1 in the course of 60 seconds for chemical metallisation, is dried at RT and is nickel-plated as in Example 1 in a chemical nickelplating bath in the course of 15 minutes.

This gives a black-metallised Cu foil having an approximately 0.2 μm thick coat of metal.

EXAMPLE 4

A 100×100 mm square piece of nylon film is activated as in Example 1 for chemical metallisation, is dried at RT and is metallised at RT in the course of 15 minutes in 2.5 liters of a chemical cobaltplating bath which is of the type customary in electroplating technology and which is made up from $CoSO_4$, dimethylaminoborane, citric acid, stabiliser and water and is then admixed with 65 ml of a 30% by weight strength aqueous dispersion. This dispersion consists of 5.4% by weight of a phthalic acid/ethanediol polyester having a mean molecular mass of 200, 16.3% by weight of a difunctional polyester, 4.9% by weight of hexamethylene diisocyanate, 1.1% by weight of diethanolamine, 1.2% by weight of n-methyldiethanolamine, 0.7% by weight of phosphoric acid (85% by weight strength) and 0.5% by weight of formaldehyde.

Within 7 minutes, an approximately 0.13 μm thick black adherent cobalt layer had been deposited. This layer is not transparent to light rays.

EXAMPLE 5

A 200×200 mm square piece of polyester plate is activated as in Example 1 and, after the solvent has been evaporated, is metallised in 2.0 liters of a commercially available chemical nickelplating bath to which 100 ml of the dispersion described in Example 1 has been added.

The surface of the plate starts to turn dark in as short a time as 30 seconds, and within 6 minutes a black stippled nickel layer had been deposited. Its surface resistance is 1.9 Ω. Its absorption and reflectance properties are identical to those of the film described in Example 1.

EXAMPLE 6

A 150×150 mm square piece of ABS plate was treated with a conventional colloidal hydrochloric acid palladium(II) chloride solution, and the palladium crystal nuclei fixed at the polymer surface were sensitised in a further, tin(II) chloride bath customary in the art of electroplating and were then metallised at RT in 2.5 liters of a commercially available nickelplating bath to which 95 ml of the dispersion described in Example 1 had been added.

The plate surface begins to turn dark after about 30 seconds, and after 90 seconds the material has been covered with a finely grained black, opaque nickel layer and, after about 5 minutes, has an electric resistance value of 1.9 Ω, and is present on the plate in an amount of about 3.4 g/m$^2$.

EXAMPLE 7

A 150×50 mm rectangle of a polybutadiene-modified nylon component is dipped into the dispersion described in Example 1, is activated as in Example 1 after some of the water has been removed at 40° C., and is then metallised in a chemical nickelplating bath specified in Example 1.

The material has been covered with a finely grained black nickel in as short a time as 45 seconds, and after about 6 minutes the chemical black-nickel coat has grown to a thickness of about 0.1 μm.

EXAMPLE 8

A 200×200 mm square of a polyethylene component is activated in the course of 45 seconds in an activating bath which is made up from 0.75 g of 9-octadecen-1-olpalladium dichloride and 1 liter of 1,1,1-trichloroethane.

The material is metallised in a chemical nickel-plating bath which has been made up as in Example 1 and to which 140 ml of polybutadiene latex is added.

The above latex has a mean particle diameter of 0.26 μm and a 31.45% by weight strength solids content of 3 carboxylating agents [parts/100 parts of butadiene].

The test specimen is observed to turn black in as short a time as 25 seconds. It was possible to coat it in the course of 5 minutes with an approximately 0.08 μm thick chemical black-nickel layer.

EXAMPLE 9

Films (40×80 mm) are prepared by casting onto glass plates 25 ml of polybutadiene latex which is in the form of an aqueous dispersion, consists of 31.5% by weight of solid having a 100% pure gel content, a pH value of about 6.6 and a mean particle diameter of 0.285 μm.

The films are heat-treated at 50° C. for 8 hours in a drying cabinet and are then activated and nickel-plated in a chemical nickelplating bath, the latter two steps being carried out as in Example 1.

After 5–8 minutes the polymer surface or polymer matrix begins to absorb finely divided black nickel.

EXAMPLE 10

A 100×100 mm square of polyvinyl chloride plate is coated with an 8% by weight strength aqueous gelatin solution, and, when the solvent has been evaporated, the plate is activated in the course of 30 seconds in an activating bath which is made up from 0.8 g of 4-cyclohexene-1,2-dicarboxylic anhydride/palladium(II) chloride and 1 liter of ethanol, and is metallised in a metallising bath described in Example 1.

After 50 seconds the polymer surface begins to absorb finely divided black nickel.

EXAMPLE 11

100×100 mm cellulose acetate dialysis film is activated and black-metallised, both steps being carried out as in Example 1.

An opaque black-metallised film is obtained in the course of 5 minutes.

EXAMPLE 12

A 0.5×200×200 mm glass-fibre-reinforced nylon 6,6 plate is treated at 40° C. for 15 minutes in a bath of 600 g of HCl (37% strength of very pure grade), 15 g of CaCl$_2$, 500 g of methanol and 7.8 g of butadiene-palladium dichloride and is washed with distilled water. The wash changes the plate surface so as to turn it into a diffuse or activated layer which is swollen to a depth of about 20 μm and is acessible to metal ions. The plate is then metallised at RT in a customary dimethylaminoborane-containing nickelplating bath. A change in colour to black can be observed in as short a time as 30 seconds. The test specimen has a continuous black Ni coat after 5 minutes.

We claim:

1. Sheet-like substrate surfaces having a 0.01 to 2 μm thick black metal coat consisting essentially of metallic Co, Cu, Ni, Fe, Ag, Au and mixtures thereof and having a reflection of at most 20% of electromagnetic radiation within the wavelength range from 200 to 5,000 nm and at least 50% within the wavelength range from 7,000 to 24,000 nm, the percentages relating to the mean value over the entire respective wavelength range said black metal coat obtained by utilizing a metallizing bath containing a polymeric organic surface-active compound having a molecular weight of at least 400 and being completely or partially swellable in aqueous media, said polymers being in the form of latices or emulsions based on styrene-butadiene or acrylonitrile graft polymers or copolymers, polyisoprene, homopolymers or copolymers, polyacrylates, polyvinyl chloride, polyvinyl acetate, polyurethane dispersions which are anionic, neutral or cationic or mixtures thereof.

2. Substrate surfaces according to claim 1, characterised in that they have been coated with Cu, Co or Ni.

3. A sheet-like substrate surface according to claim 1 wherein said black metal coat comprises metallic cobalt.

4. A sheet-like substrate according to claim 1 wherein said metallic coat comprises metallic copper.

5. A sheet-like substrate according to claim 1 wherein said metal coat comprises metallic nickel.

6. A sheet-like substrate according to claim 1 wherein said black metal coat comprises metallic iron.

7. A sheet-like substrate according to claim 1 wherein said black metal coat comprises metallic silver.

8. A sheet-like substrate according to claim 1 wherein said black metal coat comprises metallic gold.

* * * * *